United States Patent
Annerino et al.

(10) Patent No.: US 9,753,204 B2
(45) Date of Patent: Sep. 5, 2017

(54) ELECTRONIC DEVICE

(71) Applicant: Wistron Corporation, New Taipei (TW)

(72) Inventors: Frank Annerino, New Taipei (TW); Andrew Rosenkranz, New Taipei (TW)

(73) Assignee: Wistron Corporation, New Taipei (TW)

( * ) Notice: Subject to any disclaimer, the term of this patent is extended or adjusted under 35 U.S.C. 154(b) by 187 days.

(21) Appl. No.: 14/835,734

(22) Filed: Aug. 26, 2015

(65) Prior Publication Data

US 2017/0059136 A1    Mar. 2, 2017

(51) Int. Cl.
 *F21V 8/00*    (2006.01)
(52) U.S. Cl.
 CPC .................. *G02B 6/0011* (2013.01)
(58) Field of Classification Search
 CPC ................................................ G02B 6/0011
 See application file for complete search history.

(56) References Cited

U.S. PATENT DOCUMENTS

| | | | |
|---|---|---|---|
| 2012/0169608 A1* | 7/2012 | Forutanpour | G09G 3/342 345/173 |
| 2012/0262495 A1* | 10/2012 | Kobayashi | G06F 1/1677 345/672 |
| 2015/0218784 A1* | 8/2015 | Mazz | A47K 3/281 4/597 |

FOREIGN PATENT DOCUMENTS

TW     201022882     6/2010

* cited by examiner

*Primary Examiner* — David V Bruce
(74) *Attorney, Agent, or Firm* — Winston Hsu

(57) ABSTRACT

An electronic device includes a casing, a circuit board, a panel module, a first backlight module set, a second backlight module set and a control unit. The circuit board is disposed inside the casing and installed with a first operating system and a second operating system. The panel module is installed on the casing and has a first icon pattern set and a second icon pattern set. The first backlight module set corresponds to the first icon pattern set. The second backlight module set corresponds to the second icon pattern set. The control unit controls the first backlight module set to illuminate the first icon pattern set when the first operating system is executed, or controls the second backlight module set to illuminate the second icon pattern set when the second operating system is executed.

14 Claims, 14 Drawing Sheets

ELECTRONIC DEVICE

BACKGROUND OF THE INVENTION

1. Field of the Invention

The present invention relates to an electronic device, and more particularly, to an electronic device with multi operating systems.

2. Description of the Prior Art

A mobile phone has been widely implemented in people's daily life. Recently, a mobile phone with multi operating system has become a trend, resulting in that it provides a user with operating interest in switching different operating systems. However, there are different categories of icon for different operating systems. Hence, how to design an electronic device with multi operating systems and with icons capable of showing a user which one of the operating systems is currently executed becomes an issue in the industry.

SUMMARY OF THE INVENTION

Thus, the present invention provides an electronic device with multi operating systems.

According to an embodiment of the present invention, an electronic device includes a casing, a circuit board, a panel module, a first backlight module set, a second backlight module set and a control unit. The circuit board is disposed inside the casing and installed with a first operating system and a second operating system. The panel module is installed on the casing and has a first icon pattern set and a second icon pattern set. The first backlight module set is disposed between the circuit board and the panel module and corresponds to the first icon pattern set. The second backlight module set is disposed between the circuit board and the panel module and corresponds to the second icon pattern set. The control unit is coupled to the first backlight module set and the second backlight module set. The control unit controls the first backlight module set to illuminate the first icon pattern set when the first operating system is executed, or controls the second backlight module set to illuminate the second icon pattern set when the second operating system is executed.

According to another embodiment of the present invention, the first backlight module set includes at least one first backlight module, the first icon pattern set includes at least one first icon pattern, and the at least one first backlight modules corresponds to the at least one first icon pattern.

According to another embodiment of the present invention, the at least one first backlight module includes a first light emitting component and a first light guiding member. The first light emitting component is mounted on the circuit board. The first light guiding member is disposed between the first light emitting component and the corresponding first icon pattern.

According to another embodiment of the present invention, the first light guiding member includes a first diffusion film and an attaching structure. The first diffusion film is spaced from the first light emitting component. The attaching structure is for attaching the first diffusion film onto the panel module.

According to another embodiment of the present invention, opacity of the first diffusion film is from 70% to 95%.

According to another embodiment of the present invention, the attaching structure includes a first attaching layer and a second attaching layer, and the first light guiding member further includes a first opaque film disposed between the first diffusion film and the corresponding first icon pattern. The first attaching layer attaches the first diffusion film and the first opaque film, and the second attaching layer attaches the first opaque film and the panel module.

According to another embodiment of the present invention, opacity of the first opaque film is from 70% to 95%.

According to another embodiment of the present invention, the second backlight module set includes at least one second backlight module, the second icon pattern set includes at least one second icon pattern, and the at least one second backlight module corresponds to the at least one second icon pattern.

According to another embodiment of the present invention, the at least one second backlight module includes a second light emitting component and a second light guiding member. The second light emitting component is mounted on the circuit board. The second light guiding member is disposed between the second light emitting component and the corresponding second icon pattern.

According to another embodiment of the present invention, the second light guiding member includes a second diffusion film and an adhesive structure. The second diffusion film is spaced from the second light emitting component. The adhesive structure is for attaching the second diffusion film onto the panel module.

According to another embodiment of the present invention, opacity of the second diffusion film is from 70% to 95%.

According to another embodiment of the present invention, the adhesive structure includes a first adhesive layer and a second adhesive layer, and the second light guiding member further includes a second opaque film disposed between the second diffusion film and the corresponding second icon pattern. The first adhesive layer attaches the second diffusion film and the second opaque film, and the second adhesive layer attaches the second opaque film and the panel module.

According to another embodiment of the present invention, opacity of the second opaque film is from 70% to 95%.

According to another embodiment of the present invention, the at least one second backlight modules is structurally identical to the at least one first backlight modules.

According to another embodiment of the present invention, the panel module includes a cover lens and a touch glass. The cover lens has a rear side, and the first icon pattern set and the second icon pattern set are formed on the rear side. The touch glass is coupled to the rear side of the cover lens and disposed between the cover lens and the circuit board.

According to another embodiment of the present invention, a plurality of first icon areas, a plurality of second icon areas and a peripheral area are defined on the rear side of the cover lens. A cover lens opaque layer is formed on the plurality of first icon areas, the plurality of second icon areas and the peripheral area. A light-proof layer is formed on the peripheral area and avoiding the plurality of first icon areas and the plurality of second icon areas.

According to another embodiment of the present invention, opacity of the cover lens opaque layer is from 89% to 95%.

In summary, the present invention utilizes the control unit to selectively control the first backlight module set or the second backlight module set to illuminate for different operating systems. In such a manner, the electronic device of the present invention has the icon patterns capable of showing a user which one of the current operating systems is currently executed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
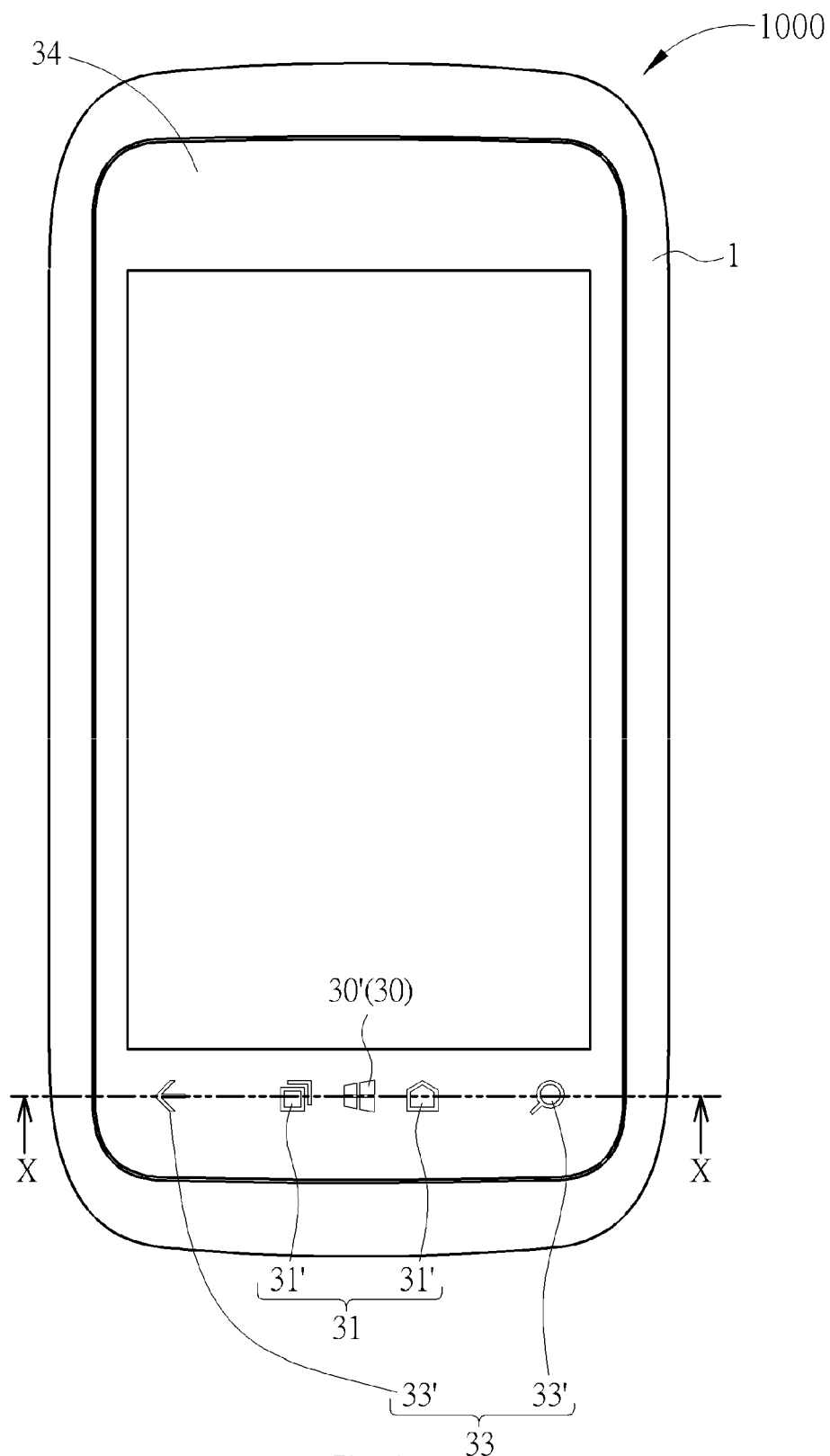
FIG. 1 is a front view of an electronic device according to an embodiment of the present invention.
Figure 2:
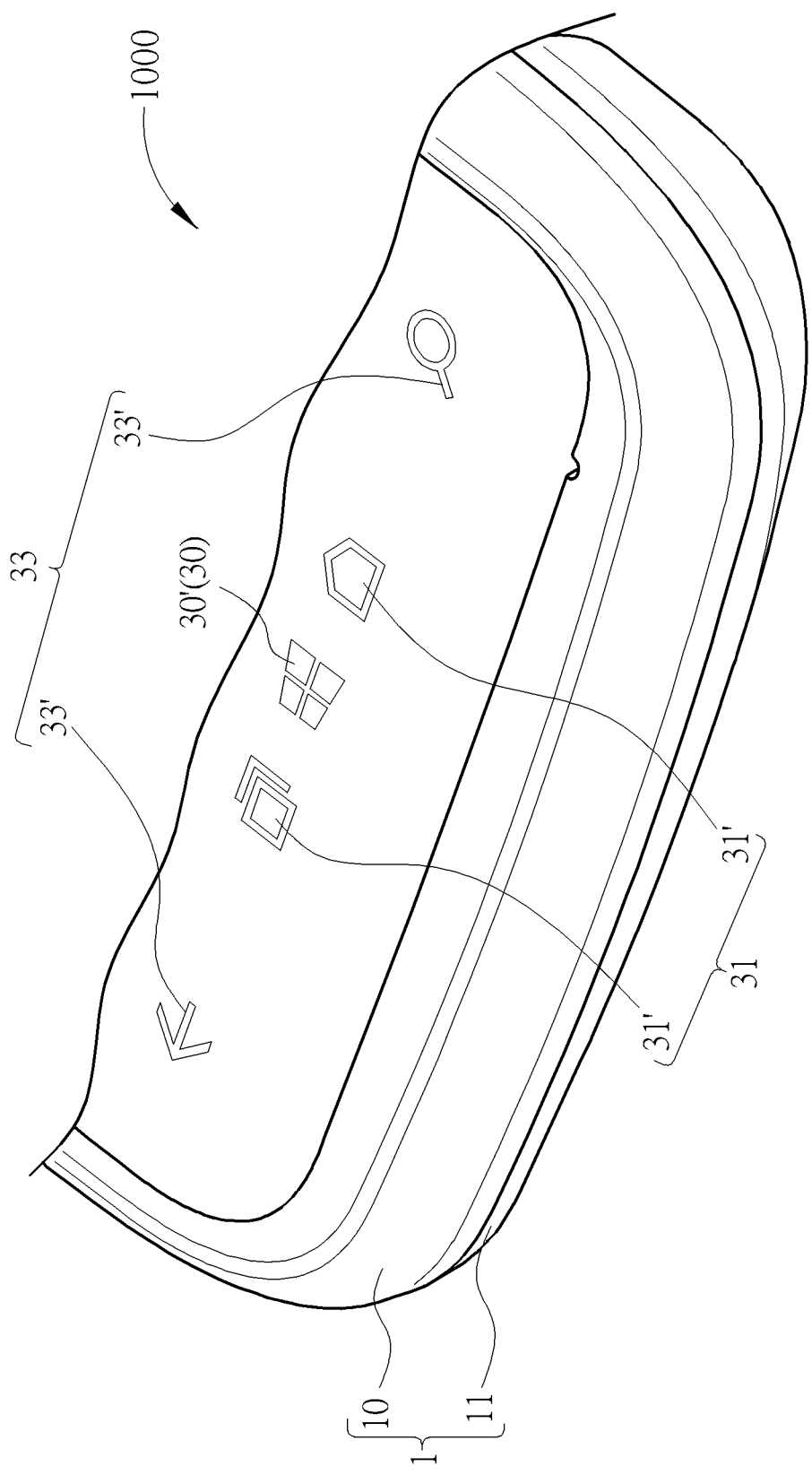
FIG. 2 is a partly schematic diagram of the electronic device according to the embodiment of the present invention.
Figure 3:
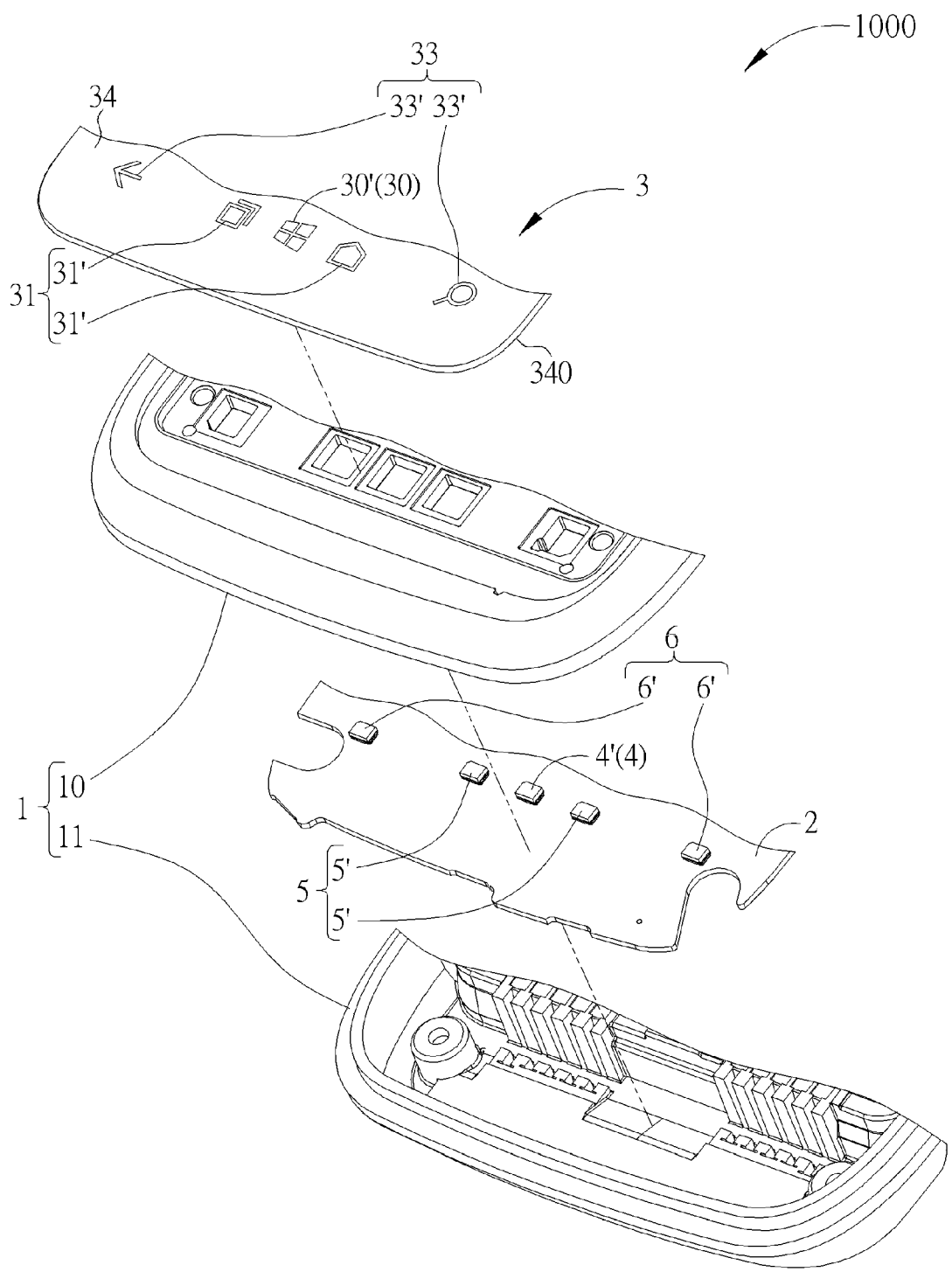
FIG. 3 is a partly exploded diagram of the electronic device according to the embodiment of the present invention.
Figure 4:
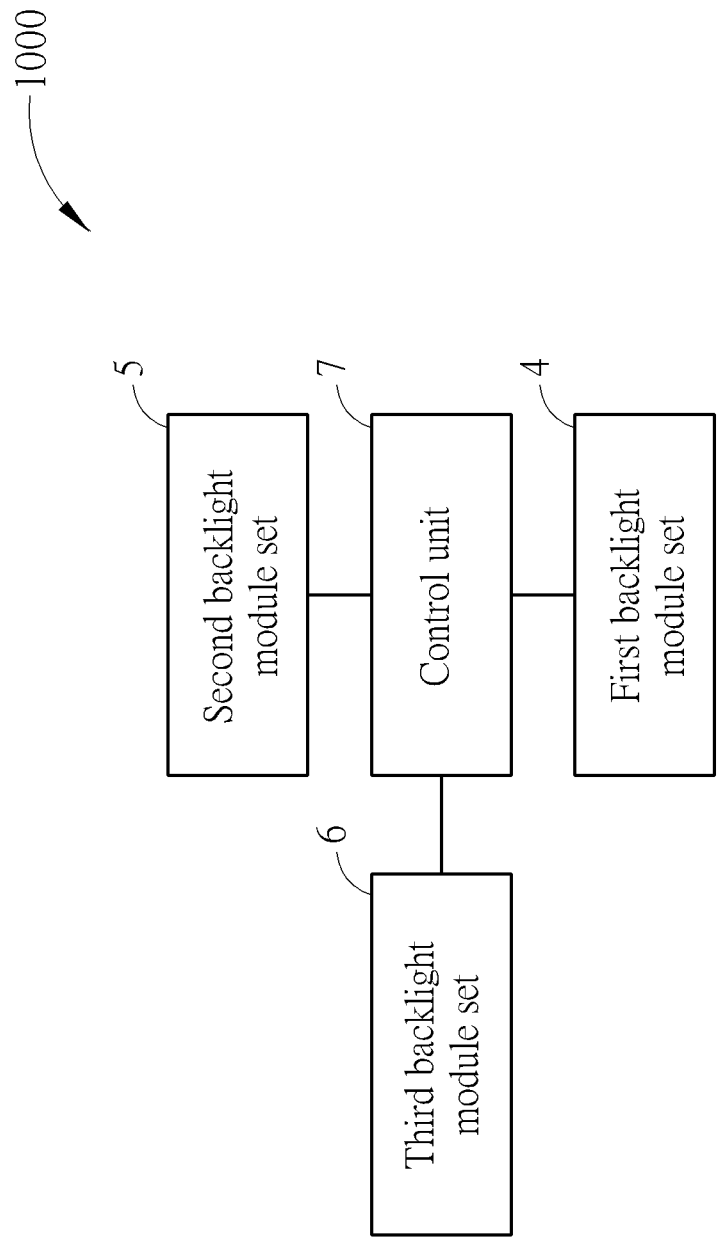
FIG. 4 is a functional block diagram of the electronic device according to the embodiment of the present invention.

Please refer to FIG. 1 to FIG. 4. FIG. 1 is a front view of an electronic device 1000 according to an embodiment of the present invention. FIG. 2 is a partly schematic diagram of the electronic device 1000 according to the embodiment of the present invention. FIG. 3 is a partly exploded diagram of the electronic device 1000 according to the embodiment of the present invention. FIG. 4 is a functional block diagram of the electronic device 1000 according to the embodiment of the present invention. As shown in FIG. 1 to FIG. 4, the electronic device 1000 includes a casing 1, a circuit board 2, a panel module 3, a first backlight module set 4, a second backlight module set 5, a third backlight module set 6 and a control unit 7. In this embodiment, the electronic device 1000 is a smart phone, the panel module 3 is a touch panel module, but the present invention is not limited thereto.

Furthermore, the circuit board 2 is disposed inside the casing 1 and installed with a first operating system and a second operating system. For example, the first operating system can be a Windows Operating System, the second operating system can be an Android Operating System, but the present invention is not limited thereto. The panel module 3 is installed on the casing 1. In this embodiment, the casing 1 includes a front housing 10 and a rear housing 11. The front housing 10 is assembled with the rear housing 11, so as to form the casing 1 for preventing inner components of the electronic device 1000 from damage due to collision and so on.

Figure 5:
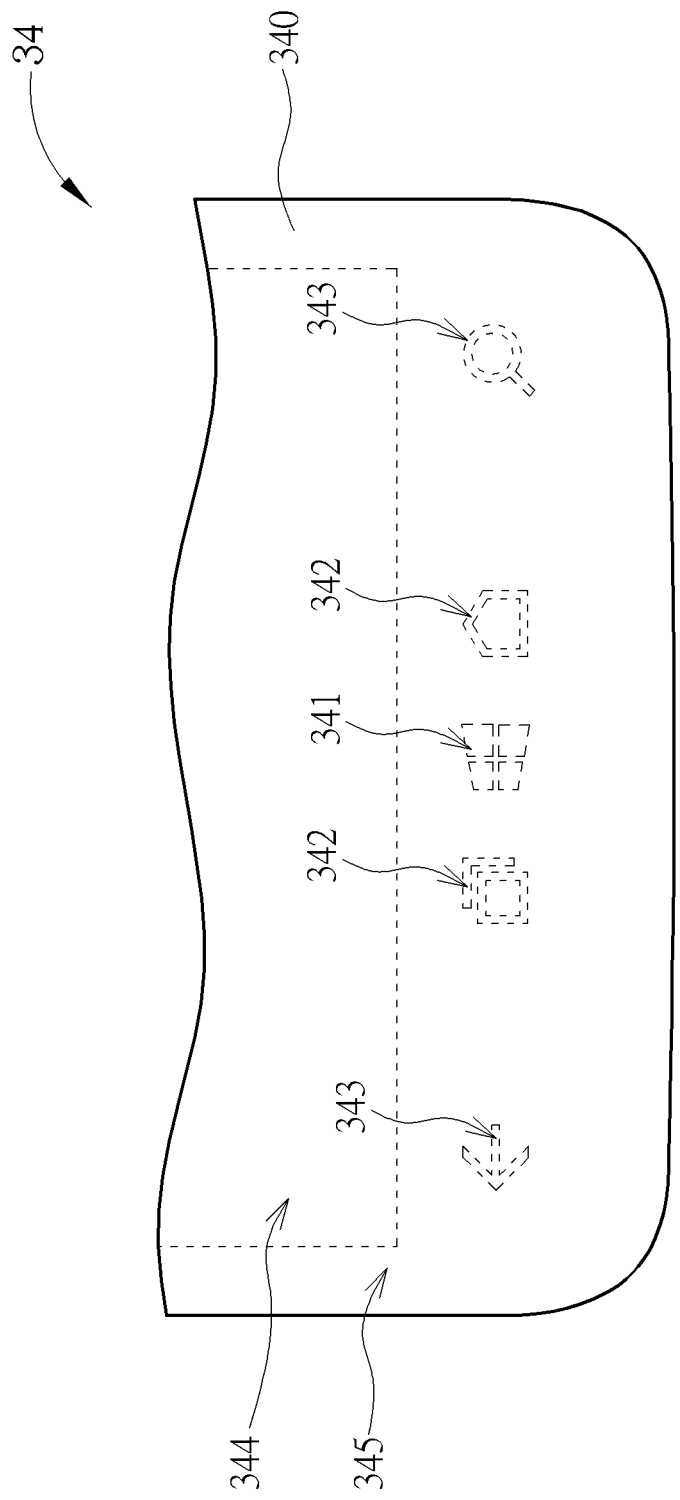
FIG. 5 to FIG. 7 are diagrams of a cover lens in different statuses according to the embodiment of the present invention.
Figure 6:
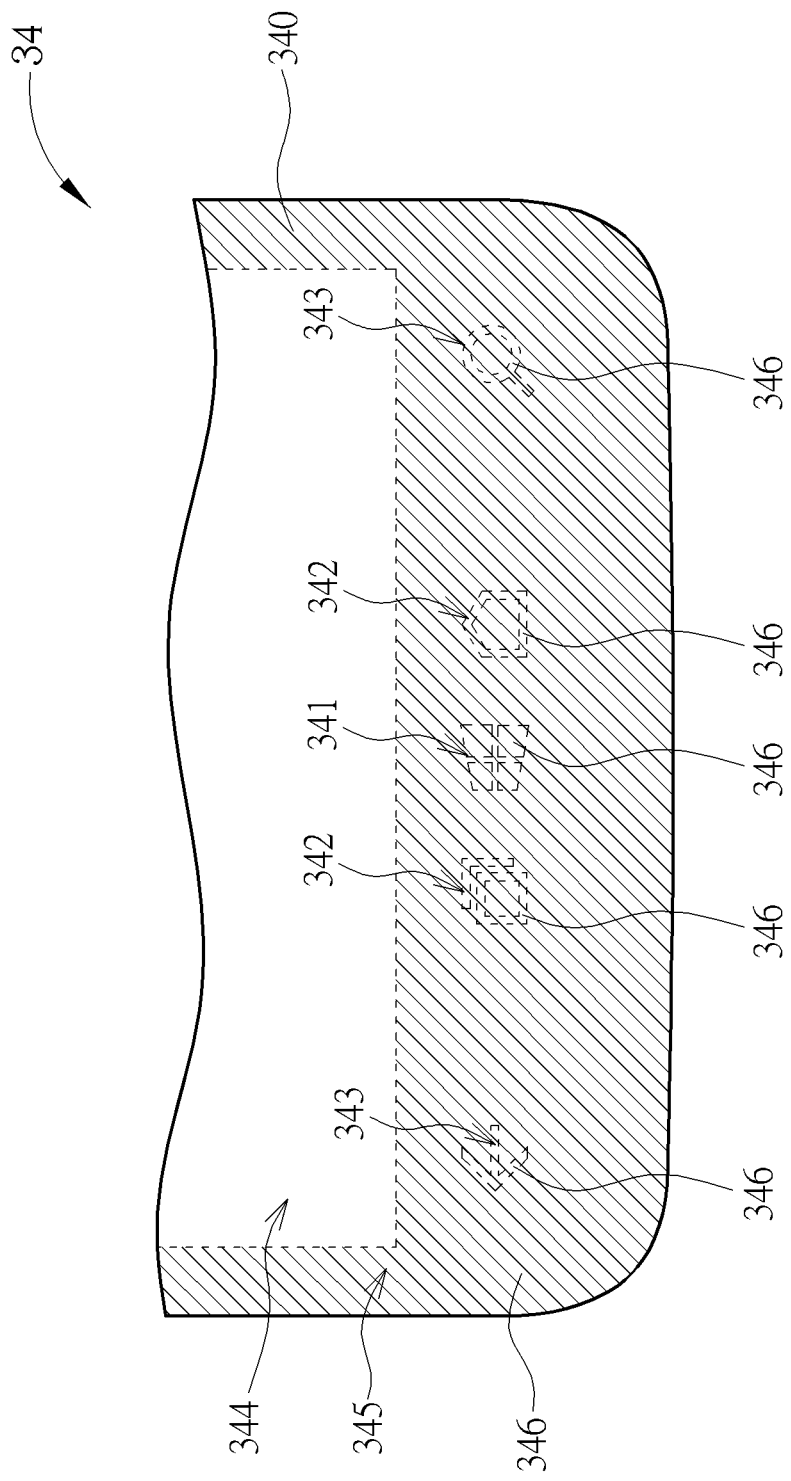
Figure 7:
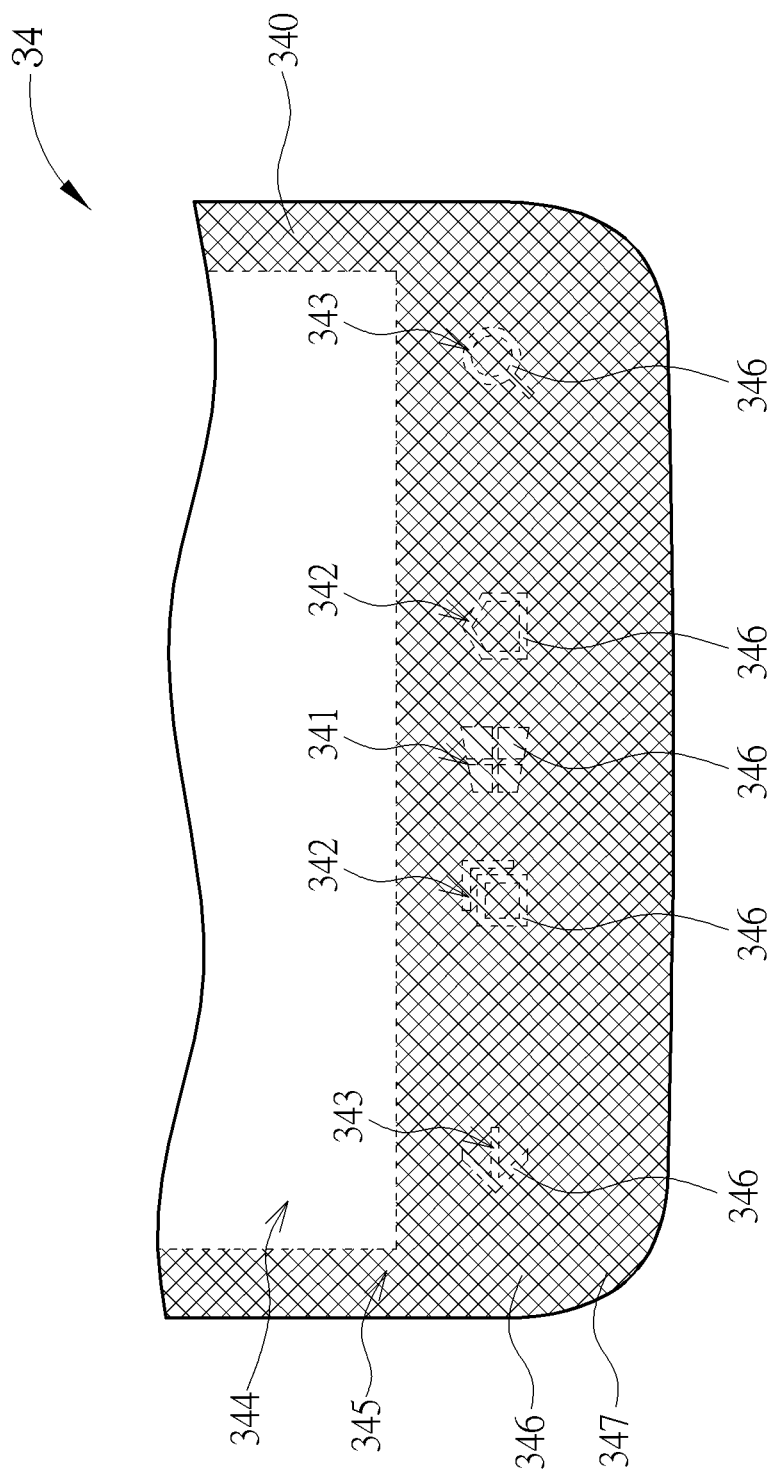

In addition, the panel module 3 has a first icon pattern set 30, a second icon pattern set 31 and a third icon pattern set 33. The panel module 3 includes a cover lens 34 and a touch glass 35, and the cover lens 34 has a rear side 340 whereon the first icon pattern set 30, the second icon pattern set 31 and the third icon pattern set 33 are formed. The touch glass 35 is coupled to the rear side 340 of the cover lens 34 and disposed between the cover lens 34 and the circuit board 2. Please refer FIG. 5 to FIG. 7. FIG. 5 to FIG. 7 are diagrams of the cover lens 34 in different statuses according to the embodiment of the present invention. In order to form the first icon pattern set 30, the second icon pattern set 31 and the third icon pattern set 33 on the rear side 340 of the cover lens 34, at first, a plurality of first icon areas 341, a plurality of second icon areas 342, a plurality of third icon areas 343, an operating window area 344 and a peripheral area 345 are defined on the rear side 340 of the cover lens 34, as shown in FIG. 5.

Afterwards, a cover lens opaque layer 346 is formed on the plurality of first icon areas 341, the plurality of second icon areas 342, the plurality of third icon areas 343 and the peripheral area 345, except for operating window area 344, as shown in FIG. 6. In this embodiment, the cover lens opaque layer 346 is made of opaque ink material with opacity from 89% to 95%, i.e., the opacity of the cover lens opaque layer 346 is from 89% to 95%. As a result, the areas covered by the cover lens opaque layer 346 (i.e., the first icon areas 341, the second icon areas 342, the third icon areas 343 and the peripheral area 345) is opaque with the opacity from 89% to 95%. Instead, the operating window area 344 is not covered by the cover lens opaque layer 346 and still transparent.

Finally, a light-proof layer 347 is formed on the peripheral area 345 and avoiding the plurality of first icon areas 341, the plurality of second icon areas 342, the plurality of third icon areas 343 and the operating window area 344, as shown in FIG. 7. As a result, the peripheral area 345 is covered by the cover lens opaque layer 346 and the light-proof layer 347, resulting in 100% light proof. The first icon areas 341, the second icon areas 342, and the third icon areas 343 are only covered by the cover lens opaque layer 346 without the light-proof layer 347, and therefore they are translucent with the opacity from 89% to 95% and results in the first icon pattern set 30, the second icon pattern set 31 and the third icon pattern set 33, respectively. The operating window area 344 is covered neither by the cover lens opaque layer 346 nor by the light-proof layer 347, and therefore it is transparent still. In such a manner, the first icon areas 341, the second icon areas 342 and the third icon areas 343 with the opacity from 89% to 95% are formed on the rear side 340 of the cover lens 34 of the panel module 3.

As shown in FIG. 1 to FIG. 4, the first backlight module set 4, the second backlight module set 5 and the third backlight module set 6 are disposed between the circuit board 2 and the panel module 3. Furthermore, the first backlight module set 4 corresponds to the first icon pattern set 30, the second backlight module set 5 corresponds to the second icon pattern set 31, and the third backlight module set 6 corresponds to the third icon pattern set 33. The control unit 7 is coupled to the first backlight module set 4, the second backlight module set 5 and the third backlight module set 6.

Figure 8:
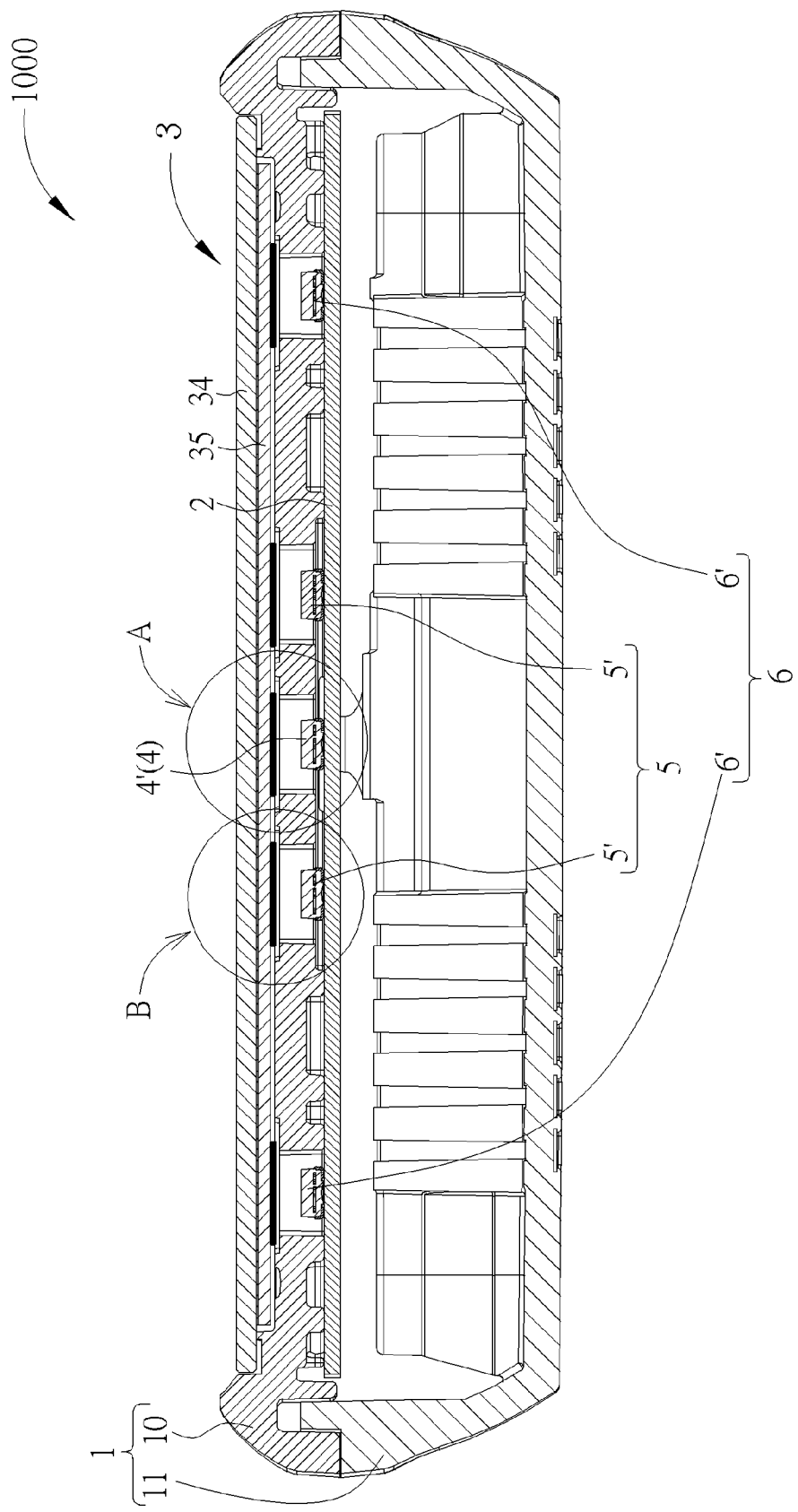
FIG. 8 is a sectional diagram of the electronic device along a section line X-X in FIG. 1.

Please refer to FIG. 8. FIG. 8 is a sectional diagram of the electronic device 1000 along a section line X-X in FIG. 1. As shown in FIG. 8, the first backlight module set 4 includes one first backlight module 4', the second backlight module set 5 includes two second backlight modules 5', and the third backlight module set 6 includes two third backlight modules 6'. The first icon pattern set 30 includes one first icon pattern 30', the second icon pattern set 31 includes two second icon patterns 31', and the third icon pattern set 33 includes two third icon patterns 33'. The one first backlight module 4' corresponds to the one first icon pattern 30', the two second backlight modules 5' respectively corresponds to the two second icon patterns 31', and the two third backlight modules 6' respectively corresponds to the two third icon patterns 33'. The amounts and configurations of the first icon pattern 30', the second icon pattern 31' and the third icon pattern 33' are limited to those illustrated in figures in this embodiment, and it depends on practical demands.

Figure 9:
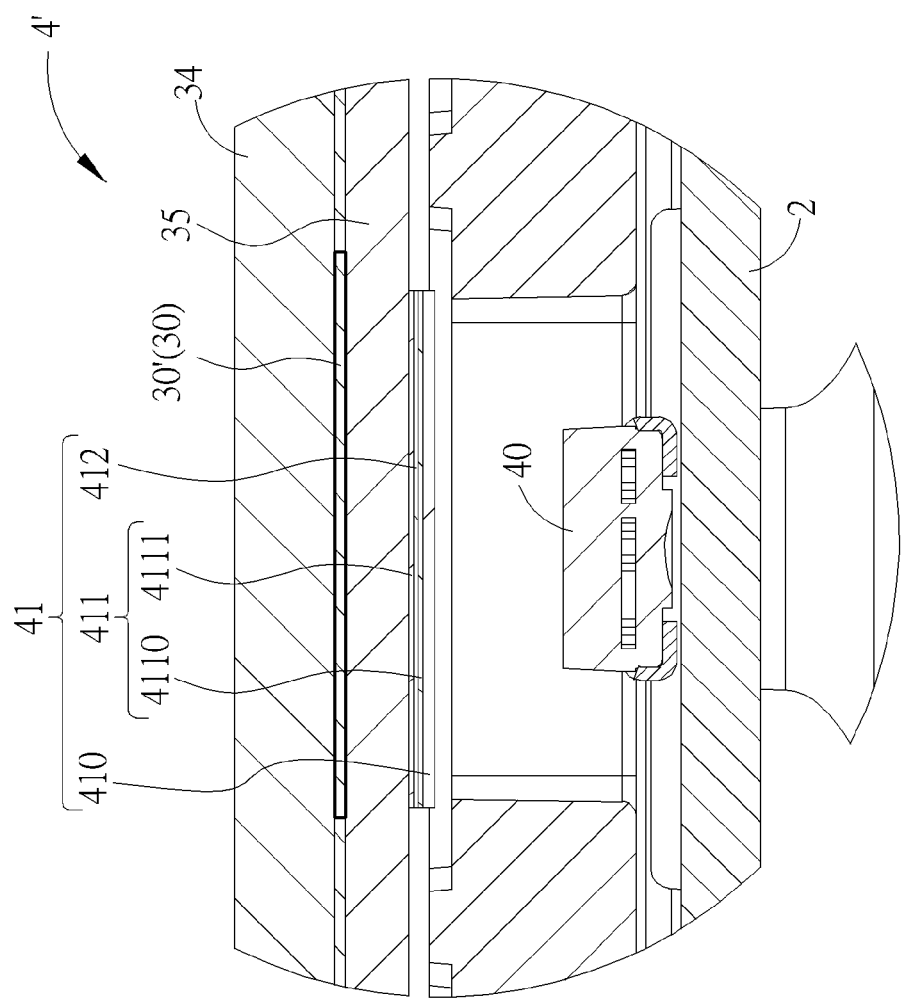
FIG. 9 is an enlarged diagram of a first backlight module taken from a detailed circle A in FIG. 8.

Please refer to FIG. 9. FIG. 9 is an enlarged diagram of the first backlight module 4' taken from a detailed circle A in FIG. 8. As shown in FIG. 9, the first backlight module 4' includes a first light emitting component 40 and a first light guiding member 41. The first light emitting component 40 is mounted on the circuit board 2 and is for emitting a light. The first light guiding member 41 is disposed between the first light emitting component 40 and the corresponding first icon pattern 30' and is for guiding the light emitted from the first light emitting component 40 toward the corresponding first icon pattern 30' more evenly.

Furthermore, the first light guiding member 41 includes a first diffusion film 410 and an attaching structure 411. The first diffusion film 410 is spaced from the first light emitting component 40 and is for diffusing the light emitted from the first light emitting component 40. In this embodiment, opacity of the first diffusion film 410 is from 70% to 95%, but the present invention is not limited thereto. In practical application, the attaching structure 411 can include a first attaching layer 4110 and a second attaching layer 4111, and the first light guiding member 41 further includes a first opaque film 412 disposed between the first diffusion film 410 and the corresponding first icon pattern 30'. The first attaching layer 4110 attaches the first diffusion film 410 and the first opaque film 412, and the second attaching layer 4111 attaches the first opaque film 412 and the touch glass 35 of the panel module 3. Accordingly, the attaching structure 411 is be able to be used for attaching the first diffusion film 410 onto the panel module 3.

In this embodiment, opacity of the first opaque film 412 can be, but not limited to, from 70% to 95%. In such a way, when the electronic device 1000 is turned off, the first opaque film 412 is able to further mask environmental light from passing via the first icon pattern set 30, so as to keep appearance requirement of the panel module 3.

Figure 10:
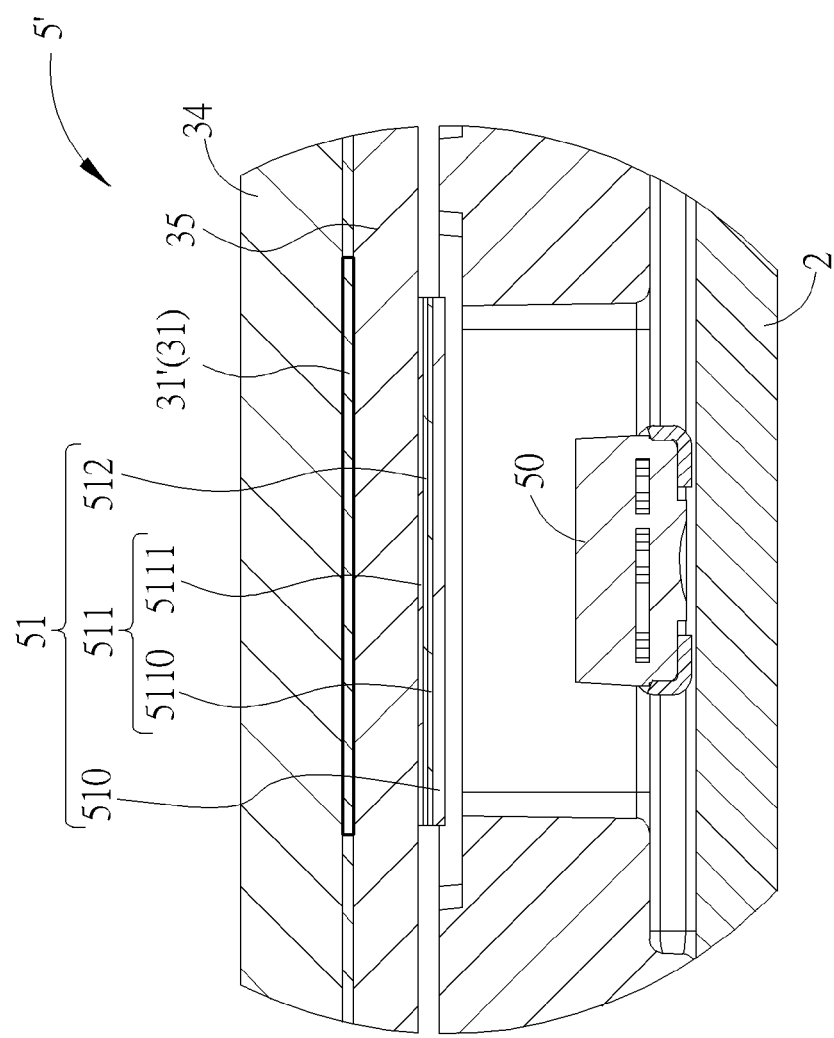
FIG. 10 is an enlarged diagram of a second backlight module taken from a detailed circle B in FIG. 8.

Please refer to FIG. 10. FIG. 10 is an enlarged diagram of the second backlight module 5' taken from a detailed circle B in FIG. 8. As shown in FIG. 10, the second backlight module 5' includes a second light emitting component 50 and a second light guiding member 51. The second light guiding member 51 includes a second diffusion film 510, an adhesive structure 511 and a second opaque film 512. Further, the adhesive structure 511 includes a first adhesive layer 5110 and a second adhesive layer 5111. The configurations and structures of the second light emitting component 50, the second light guiding member 51, the second diffusion film 510, the adhesive structure 511, the second opaque film 512, the first adhesive layer 5110 and the second adhesive layer 5111 are the same as those of the first light emitting component 40, the first light guiding member 41, the first diffusion film 410, the attaching structure 411, the first opaque film 412, the first attaching layer 4110 and the second attaching layer 4111, and the related descriptions are omitted herein for simplicity.

In practical application, the first backlight module 4', the second backlight module 5' and the third backlight module 6' are structurally identical, i.e., the first backlight module 4', the second backlight module 5' and the third backlight module 6' have the same components and configurations, and therefore the related descriptions for the configurations and structures of the third backlight module 6' is omitted herein for simplicity.

Figure 11:
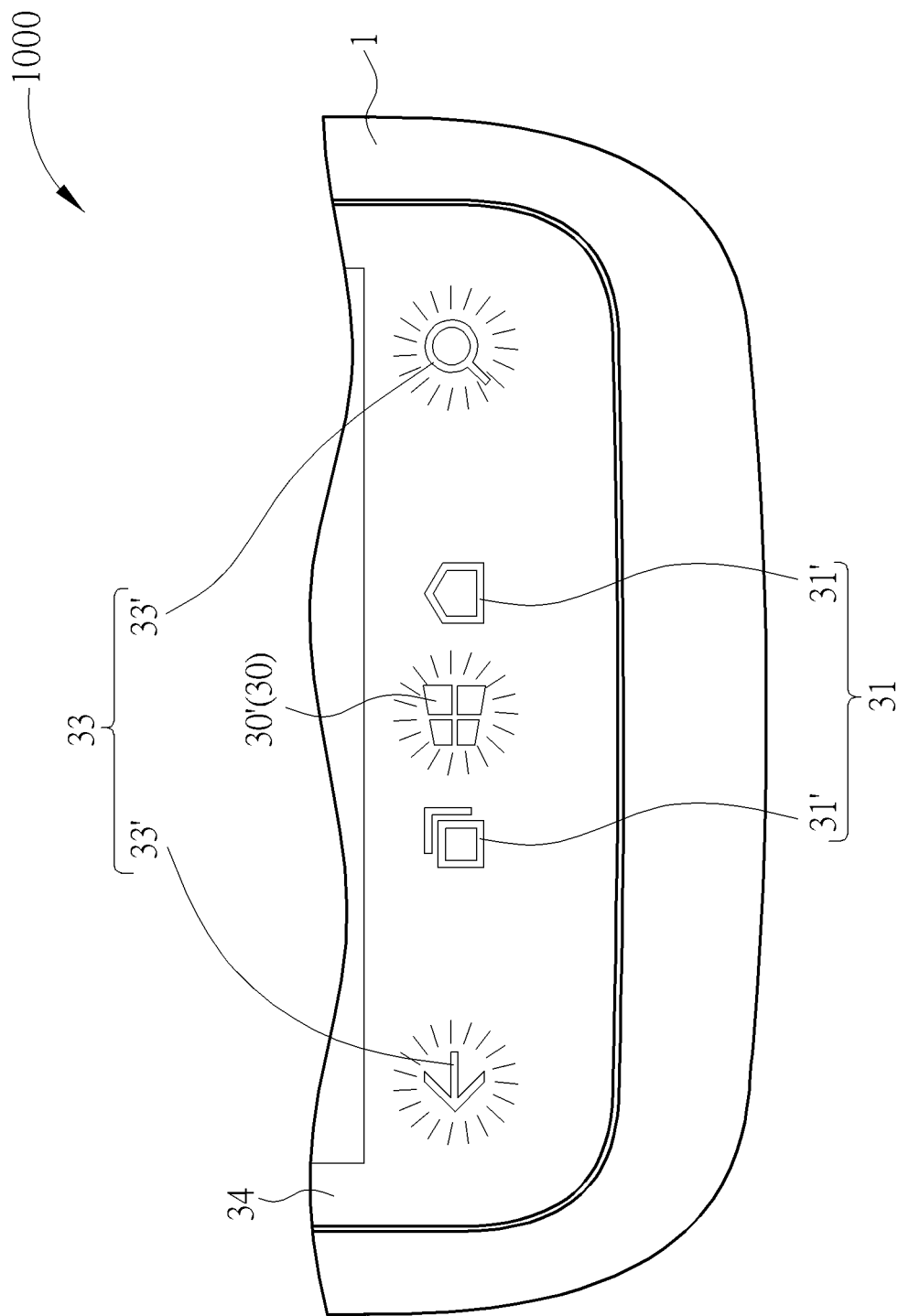
FIG. 11 is a front view of the electronic device when the first operating system is executed according to the embodiment of the present invention.
Figure 12:
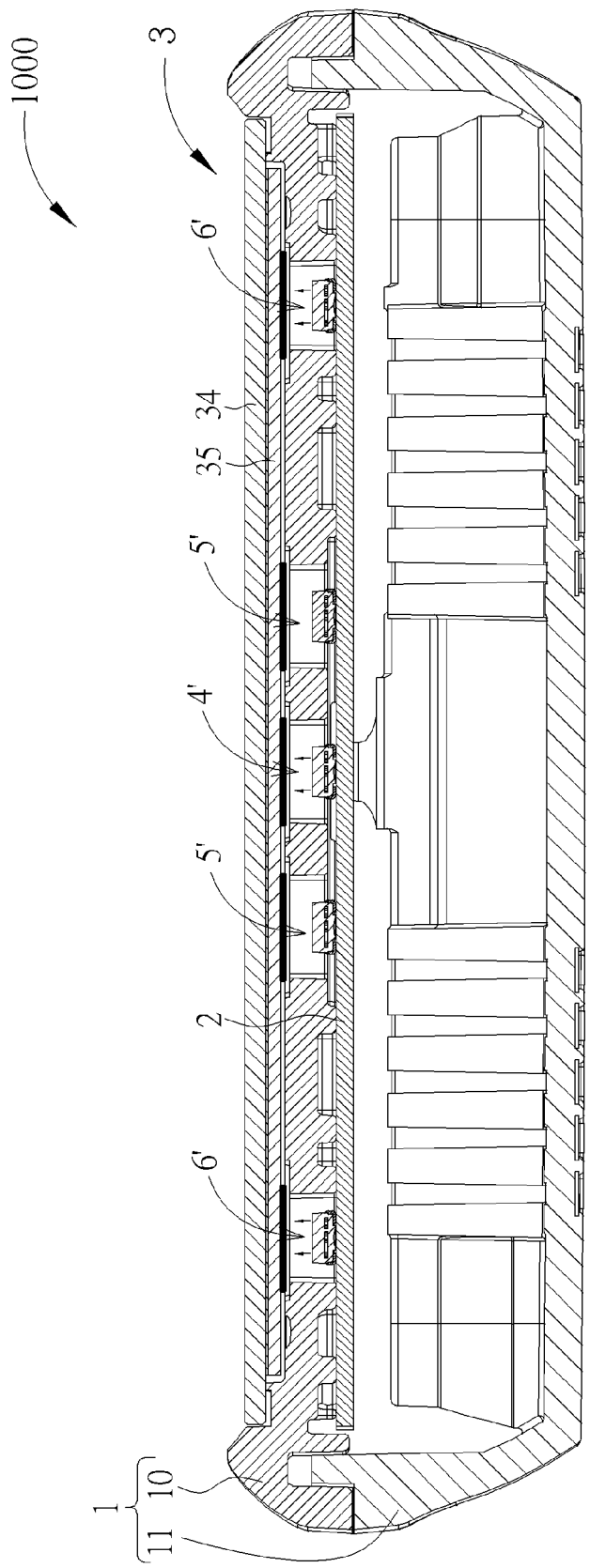
FIG. 12 is a sectional diagram of the electronic device with respect to the FIG. 11.
Figure 13:
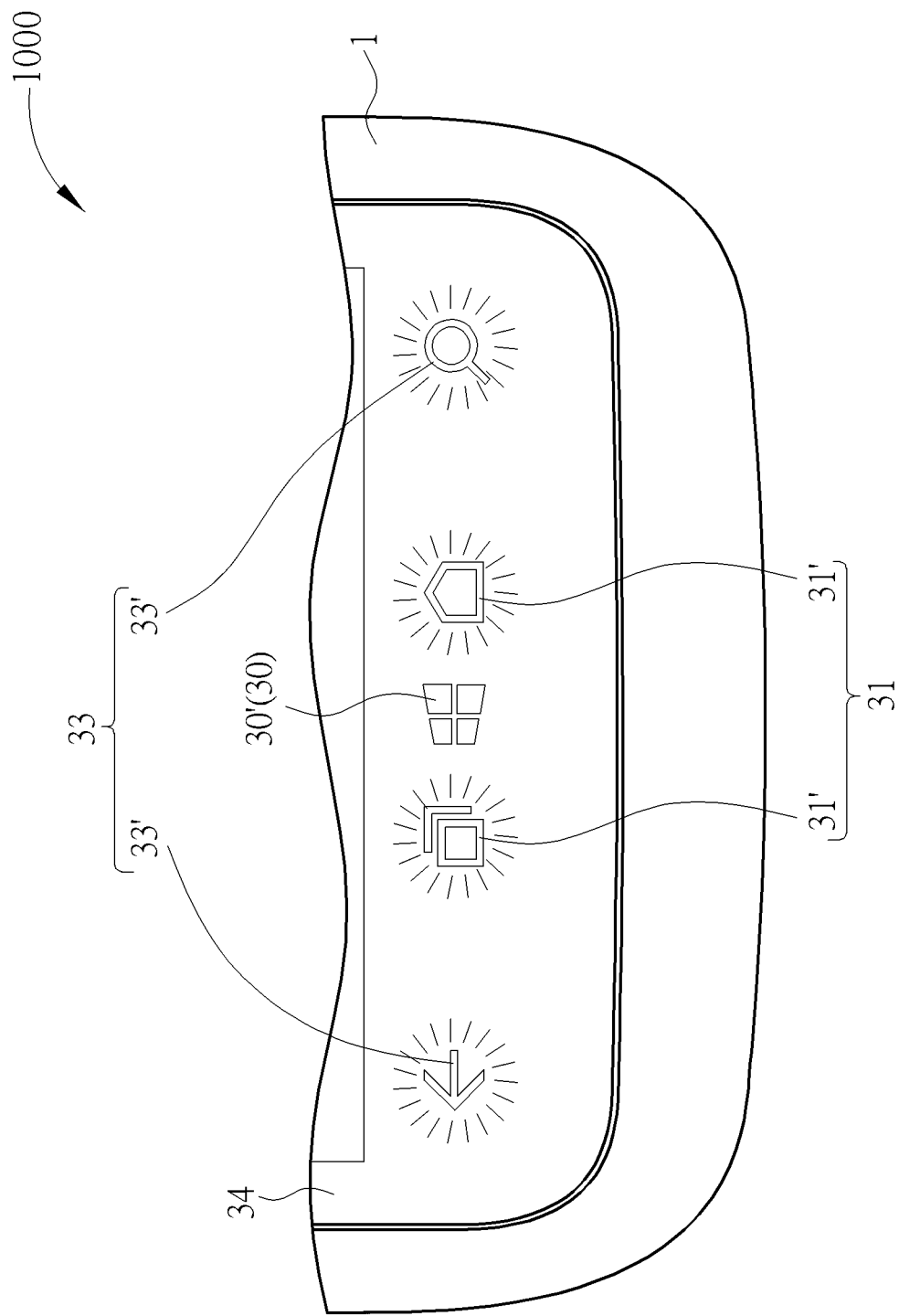
FIG. 13 is a front view of the electronic device when the second operating system is executed according to the embodiment of the present invention.
Figure 14:
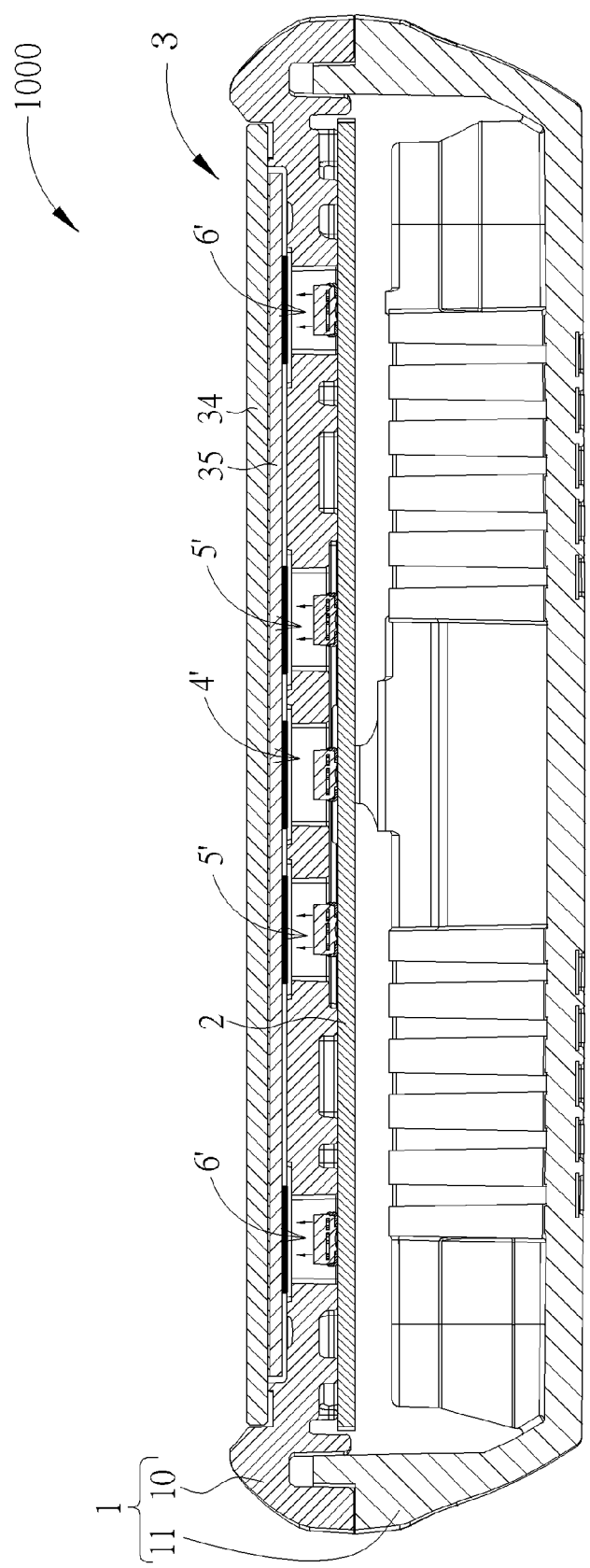
FIG. 14 is a sectional diagram of the electronic device with respect to the FIG. 13.

Please refer to FIG. 11 to FIG. 14. FIG. 11 is a front view of the electronic device 1000 when the first operating system is executed according to the embodiment of the present invention. FIG. 12 is a sectional diagram of the electronic device 1000 with respect to the FIG. 11. FIG. 13 is a front view of the electronic device 1000 when the second operating system is executed according to the embodiment of the present invention. FIG. 14 is a sectional diagram of the electronic device 1000 with respect to the FIG. 13. As shown in FIG. 11 and FIG. 12, when the electronic device 1000 is turned on and the first operating system is selectively executed, the control unit 7 controls the first backlight module set 4 and the third backlight module set 6 to illuminate the first icon pattern set 30 and the third icon pattern set 33. Meanwhile, the illuminated first icon pattern set 30 and the illuminated third icon pattern set 33 can be seen, and a user can tell that the first operating system is currently executed for the electronic device 1000. At the same time, the other icon pattern sets (in this case, the second icon pattern set 31) that are not illuminated are invisible to the user of the device.

As shown in FIG. 13 and FIG. 14, when the electronic device 1000 is turned on and the second operating system is selectively executed, the control unit 7 controls the second backlight module set 5 and the third backlight module set 6 to illuminate the second icon pattern set 31 and the third icon pattern set 33. Meanwhile, the illuminated second icon pattern set 31 and the illuminated third icon pattern set 33 can be seen, and a user can tell that the second operating system is currently executed for the electronic device 1000. At the same time, the other icon pattern sets (in this case, the first icon pattern set 30) that are not illuminated are invisible to the user of the device.

Compared to the prior art, the present invention utilizes the control unit to selectively control the first backlight module set or the second backlight module set to illuminate for different operating systems. In such a manner, the electronic device of the present invention has the icon patterns capable of showing a user which one of the current operating systems is currently executed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An electronic device comprising:
 a casing;
 a circuit board disposed inside the casing and installed with a first operating system and a second operating system;

a panel module installed on the casing and having a first icon pattern set and a second icon pattern set, the first icon pattern set comprising at least one first icon pattern;

a first backlight module set disposed between the circuit board and the panel module, the first backlight module set corresponding to the first icon pattern set, the first backlight module set comprising at least one first backlight module corresponding to the at least one first icon pattern, the at least one first backlight module comprising:
  a first light emitting component mounted on the circuit board; and
  a first light guiding member disposed between the first light emitting component and the corresponding first icon pattern, the first light guiding member comprising:
    a first diffusion film spaced from the first light emitting component and
    an attaching structure for attaching the first diffusion film onto the panel module;

a second backlight module set disposed between the circuit board and the panel module, the second backlight module set corresponding to the second icon pattern set; and a control unit coupled to the first backlight module set and the second backlight module set, the control unit controlling the first backlight module set to illuminate the first icon pattern set when the first operating system is executed, or controlling the second backlight module set to illuminate the second icon pattern set when the second operating system is executed.

2. The electronic device of claim 1, wherein opacity of the first diffusion film is from 70% to 95%.

3. The electronic device of claim 1, wherein the attaching structure comprises a first attaching layer and a second attaching layer, and the first light guiding member further comprises:
  a first opaque film disposed between the first diffusion film and the corresponding first icon pattern, the first attaching layer attaching the first diffusion film and the first opaque film, the second attaching layer attaching the first opaque film and the panel module.

4. The electronic device of claim 3, wherein opacity of the first opaque film is from 70% to 95%.

5. An electronic device comprising:
  a casing;
  a circuit board disposed inside the casing and installed with a first operating system and a second operating system;
  a panel module installed on the casing and having a first icon pattern set and a second icon pattern set, the first icon pattern set comprising at least one first icon pattern, the second pattern set comprising at least one second icon pattern;
  a first backlight module set disposed between the circuit board and the panel module, the first backlight module set corresponding to the first icon pattern set, the first backlight module set comprising at least one first backlight module corresponding to the at least one first icon pattern;
  a second backlight module set disposed between the circuit board and the panel module, the second backlight module set corresponding to the second icon pattern set, the second backlight module set comprising at least one second backlight module corresponding to the at least one second icon pattern, the second backlight module comprising:
    a second light emitting component mounted on the circuit board; and
    a second light guiding member disposed between the second light emitting component and the corresponding second icon pattern, the second light guiding member comprising:
      a second diffusion film spaced from the second light emitting component; and
      an adhesive structure for attaching the second diffusion film onto the panel module; and
  a control unit coupled to the first backlight module set and the second backlight module set, the control unit controlling the first backlight module set to illuminate the first icon pattern set when the first operating system is executed, or controlling the second backlight module set to illuminate the second icon pattern set when the second operating system is executed.

6. The electronic device of claim 5, wherein opacity of the second diffusion film is from 70% to 95%.

7. The electronic device of claim 5, wherein the adhesive structure comprises a first adhesive layer and a second adhesive layer, and the second light guiding member further comprises:
  a second opaque film disposed between the second diffusion film and the corresponding second icon pattern, the first adhesive layer attaching the second diffusion film and the second opaque film, the second adhesive layer attaching the second opaque film and the panel module.

8. The electronic device of claim 7, wherein opacity of the second opaque film is from 70% to 95%.

9. An electronic device comprising:
  a casing;
  a circuit board disposed inside the casing and installed with a first operating system and a second operating system;
  a panel module installed on the casing and having a first icon pattern set and a second icon pattern set, the first icon pattern set comprising at least one first icon pattern, the second icon pattern set comprising at least one second icon pattern;
  a first backlight module set disposed between the circuit board and the panel module, the first backlight module set corresponding to the first icon pattern set, the first backlight module set comprising at least one first backlight module corresponding to the at least one first icon pattern;
  a second backlight module set disposed between the circuit board and the panel module, the second backlight module set corresponding to the second icon pattern set, the second backlight module set comprising at least one second backlight module corresponding to the second icon pattern, the at least one second backlight module being substantially identical to the at least one first backlight module; and
  a control unit coupled to the first backlight module set and the second backlight module set, the control unit controlling the first backlight module set to illuminate the first icon pattern set when the first operating system is executed, or controlling the second backlight module set to illuminate the second icon pattern set when the second operating system is executed.

10. The electronic device of claim 9, wherein the at least one first backlight module comprises:

a first light emitting component mounted on the circuit board; and a first light guiding member disposed between the first light emitting component and the corresponding first icon pattern.

11. The electronic device of claim 9, wherein the at least one second backlight module comprises:

a second light emitting component mounted on the circuit board; and a second light guiding member disposed between the second light emitting component and the corresponding second icon pattern.

12. An electronic device comprising:

a casing;

a circuit board disposed inside the casing and installed with a first operating system and a second operating system;

a panel module installed on the casing and having a first icon pattern set and a second icon pattern set, the panel module comprising:

a cover lens having a rear side, the first icon pattern set and the second icon pattern set being formed on the rear side; and a touch glass coupled to the rear side of the cover lens and disposed between the cover lens and the circuit board;

a first backlight module set disposed between the circuit board and the panel module, the first backlight module set corresponding to the first icon pattern set;

a second backlight module set disposed between the circuit board and the panel module, the second backlight module set corresponding to the second icon pattern set; and a control unit coupled to the first backlight module set and the second backlight module set, the control unit controlling the first backlight module set to illuminate the first icon pattern set when the first operating system is executed, or controlling the second backlight module set to illuminate the second icon pattern set when the second operating system is executed.

13. The electronic device of claim 12, wherein a plurality of first icon areas, a plurality of second icon areas and a peripheral area are defined on the rear side of the cover lens, a cover lens opaque layer is formed on the plurality of first icon areas, the plurality of second icon areas and the peripheral area, a light-proof layer is formed on the peripheral area and avoiding the plurality of first icon areas and the plurality of second icon areas.

14. The electronic device of claim 13, wherein opacity of the cover lens opaque layer is from 89% to 95%.

* * * * *